Dec. 12, 1972   O. BAUERLE ET AL   3,705,997

COMMUTATOR

Filed July 9, 1971

INVENTOR
OSKAR BÄUERLE
WILFRIED KUBEL
ERNST MÜNSTER
KARL SCHWEIKERT
GEORG STROBL

BY   MICHAEL S. STRIKER

ATTORNEY

United States Patent Office 3,705,997
Patented Dec. 12, 1972

3,705,997
COMMUTATOR
Oskar Bauerle, Senftertalweg 15, Buhl, Germany; Wilfried Kubel, Im Kossler, Altschweier, Germany; Ernst Munster, Oberhof 9, Vimbuch, Germany; and Karl Schweikert, Obervogt-Haefelin Str. 41b; and Georg Strobl, Obervogt-Haefelin Str. 41a, both of Buhl, Germany
Filed July 9, 1971, Ser. No. 161,231
Claims priority, application Germany, July 11, 1970, P 20 34 502.2
Int. Cl. H02k 13/04
U.S. Cl. 310—237                                               7 Claims

ABSTRACT OF THE DISCLOSURE

A hub of electrically insulating material carries a plurality of elongated electrically conductive lamellas. Each of the lamellas has an exposed contact face, a first end portion embedded in the material of the hub, an intermediate portion also embedded and a second end portion which projects from the hub and is of hook-shaped configuration with its general plane including an angle of substantially 90° with the general plane of the exposed contact face.

BACKGROUND OF THE INVENTION

The present invention relates generally to an article of manufacture, and more particularly to a novel commutator. Still more particularly the invention relates to a novel commutator for electrical machines with electrically conductive lamellas which are anchored in a hub of electrically insulating material.

The prior art includes proposals for contacting commutator lamellas with the ends of the armature windings of electrical machines according to the so-called Hot-Stacking method. To do this, an electrode is placed onto the bent-over end portion of a lamella-conecting hook and the winding end which surrounds this hook is welded to the hook by the heat of electrical current passing trough them. This requires, however, that the connecting hooks of the lamellas be properly accessible for contacting with the welding electrode, and in addition that they be provided with a sufficiently strong backing or support in order to be able to withstand the pressure of the welding electrode during the welding process.

Generally speaking, it can be said that with the customary drum-type commutators or cage-type commutators these requirements are usually capable of being readily met. However, in the case of disk-shaped or planar commutators this is more difficult, especially when the commutator is exteriorly surrounded by the stack of armature plates, so that only one axial end face of the planar commutator is available for contacting the lamellas with the welding electrode and in order to secure to them the armature windings.

The prior art suffers from a further disadvantage in that where a commutator is to be provided with a large number of such lamellas, the connecting hooks for connecting the armature winding with the lamellas frequently are so closely adjacent one another that it is difficult to effect engagement of the armature windings wtih these hooks by way of a machine—which of course is the only economically feasible approach in most instances—and that during contacting with the welding electrode for welding purposes the adjacent hooks and winding end portions are frequently damaged.

SUMMARY OF THE INVENTION

It is, accordingly, a general object of the present invention to avoid the aforementioned disadvantages.

More particularly it is an object of the present invention to provide an improved commutator which is not possessed of these disadvantages.

An additional object of the invention is to provide such an improved commutator which can be readily manufactured and equally readily connected with the winding ends of armature windings.

In pursuance of the above objects, and of others which will become apparent hereafter, one feature of the invention resides in a commutator which, briefly stated, comprises a hub of electrically insulating material and a plurality of elongated electrically conductive lamellas carried by this hub. Each of the lamellas has an exposed contact face, a first and a second end portion at opposite ends of the contact face, and an intermediate portion adjacent the second end portion. The first end portion and the intermediate portion are embedded in the hub and the second end portion is of hook-shaped configuration, exposed exteriorly of the hub and having a general plane which includes an angle of substantially 90 degrees with the general plane of the exposed contact face.

If the hub is disk-shaped and the contact face is exposed at one major side of the hub, then it is advantageous if the second end portion projects beyond the second or opposite major side of the disk-shaped hub, substantially at right angles to the general plane of the hub. This means that the hook-shaped second end portion is readily and freely accessible at this opposite major side for contacting with the welding electrode and for connecting of the winding end portion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
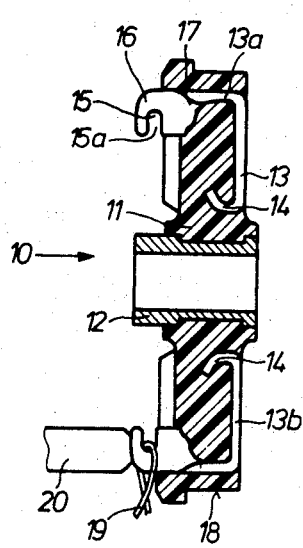
FIG. 1 is an axial section through a commutator according to one embodiment of the invention.
Figure 2:
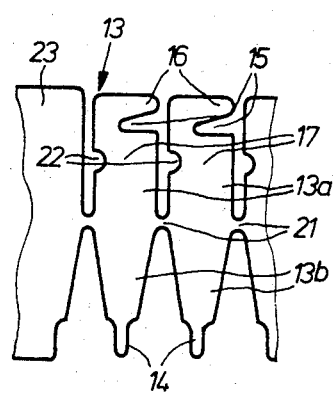
FIG. 2 is a fragmentary plan view of lamellas which are to be used in the embodiment of FIG. 1 but prior to such use.

Discussing the drawing now in detail, and referring firstly to the embodiment illustrated in FIGS. 1 and 2, it will be seen that in FIG. 1 we have designated a disk-shaped commutator generally with reference numeral 10. It has a hub 11 of electrically insulating material, for instance a suitable synthetic plastic of one of the various types which are well known for this purpose. At its center the hub 11 is provided with a metallic bushing 11 so that it can be secured on the shaft of an electrical machine. One major side of the disk-shaped hub 11 is provided with a plurality of radially extending lamellas 13 which are elongated and consist of electrically conductive material. Each of the lamellas 13 has an inner or first end portion 14 which is inwardly bent and embedded in the material of the hub 11. Each has further a second or outer end portion 13a which is bent over approximately at a right angle with reference to the exposed contact face 13b the respective lamella and extends substantially at a right angle to the general plane of the hub 11. Furthermore, within the material of the hub 11 each of these end portions 13a is twisted through substantially 90 degrees with reference to the general plane of the remainder of the lamella, that is with reference to that portion of the lamella having the exposed contact face 13b.

The end portions 13a are provided with lateral cut-outs or recesses 15 so that when they are twisted they constitute hook-shaped configurations 16 which project beyond the opposite major side of the hub 11 and which, due to the aforementioned twisting, are oriented radially relative to the commutator axis with their inwardly directed openings 15a of the hook-shaped configuration. The elongation of the lamellas 13, and more particularly of the portion provided with the exposed contact face 13b, is smaller than the radius of the hub 11 to assure that the end portions 13a are fully embedded in the insulating material of the hub 11 with an intermediate part as illustrated in FIG. 1.

The outer circumferential surface of the hub 11 is provided with a stepped recess 18 to permit a non-illustrated ring-shaped package of armature plates of an electrical machine to be placed over the outer periphery and to be secured on the hub 11 with its armature windings.

The novel commutator thus far described, and in particular the configuration and orientation of the hook-shaped end portions 16, assures that the end portions 16 are readily and completely accessible for engaging the winding ends 19 of a non-illustrated armature winding (one winding end 19 is shown in FIG. 1) with these hook-shaped end portions, and also that these end portions can be readily contacted with a welding electrode 20, as also shown in FIG. 1. On the other hand, the entire exposed contact face 13b of the lamellas 13 is available for contact and engagement with the non-illustrated carbon brushes of an electrical device.

FIG. 2 shows that the lamellas of the embodiment in FIGS. 1 and 2 are stamped from a metallic band 23, here a cover band and are initially connected by small bridging portions 21 so that when they are formed to annular configuration in order to be used with the hub 11, they all adhere together. Subsequently the contacting portions or bridging portions 21 will be removed. They are located at the upper end of the contact face 13b so that the end portions 13a can be angled off through 90 degrees in rearward direction immediately above the bridging portions 21. In the region 17, where the end portions 13a are also to be twisted, each lamella is further provided with an additional lateral recess or cut-out 22, the various lamellas 13 are always twisted at the same location intermediate the hook-shaped portions 16 and the exposed contact face 13b, and that further the hook-shaped portion will be properly and adequately heated by the current during welding connection of the winding end portions 19. The recess 15 of the hook-shaped portion 16, as well as the recess 22 in the region 17, are provided at opposite marginal portions of the respective lamella 13.

Once the lamellas have been stamped from a strip of copper in the configuration shown in FIG. 2, the end portions 13a are bent over at right angles (and at the same time the end portions 14 can also be bent over) and then the end portions 13a are twisted in the region of the recesses 22 through 90 degrees with reference to the general plane of the remainder of the respective lamella. Thereupon the lamellas which are still connected by the bridging portions 21 are shaped to form an annulus in known manner, and then are embedded in a press-form in the material of the hub 11 which is being formed in this form. Once the commutator is thus produced and has the configuration shown in FIG. 1, the bridging portions 21 are removed in suitable manner well known to those skilled in the art, and the commutator is now ready for having the winding end portions 19 secured to the respective hook-shaped portions 16.

Figure 3:
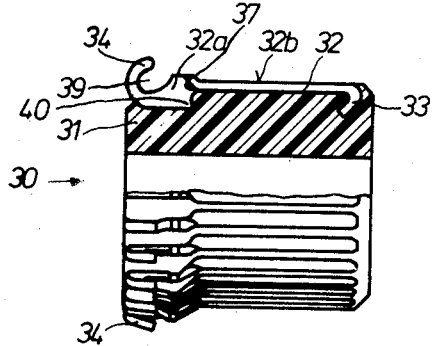
FIG. 3 is a view similar to FIG. 1 but illustrating a further embodiment of the invention and only in a partial section.
Figure 4:
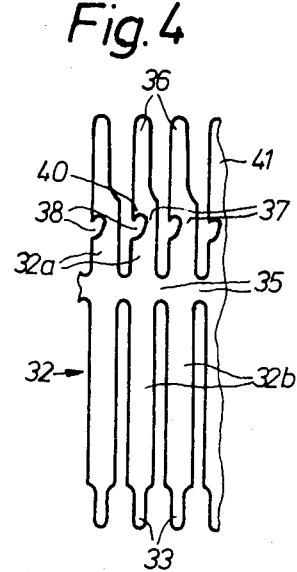
FIG. 4 is a view similar to FIG. 2 but illustrating the lamellas for use with the embodiment of FIG. 3.

In FIGS. 3 and 4 we have shown a further embodiment of the invention, on hand of a drum or cage type commutator 30 having a large number of lamellas 32. The hub is here illustrated as of substantially drum-shaped or cylindrical configuration and identified with reference numeral 31. It is provided on its outer circumference with a plurality of lamellas 32 which extend in its axial direction and are anchored in the material of the hub 31. Each of the lamellas 32 is provided with an inwardly bent end portion 33 which is anchored in the material of the hub 31, and each lamella further has another end portion 32a which is twisted through approximately 90° with respect to the general plane of the exposed contact face 32b of the respective lamella 32. A recess 39 provided at the respective end portion 32 forms a book 34.

The lamellas in FIG. 3 are again formed by stamping them from a strip of sheet metal, here copper 41. They are again connected by narrow bridge portions 35 which will subsequently be removed. In the embodiment of FIGS. 3 and 4 a large number of lamellas is provided, and as a result of this each individual lamella 32 is of very narrow configuration. For this reason the recess 39 for the respective hooks 34 cannot be stamped from the material of each lamella 32, because of the insufficient width of the respective lamellas. Instead we propose that we form a tongue 36 at the end portion 32a of each lamella, which tongue is narrower than the width of the lamella and which, after the end portion 32a has been twisted through 90° as mentioned before, is then bent over upon itself to form the recess 39 as shown in FIG. 3. In the region where they are twisted, the end portions 32a are provided additionally with a lateral recess or cut-out 38 which facilitates this twisting and which at the same time is bounded by a claw-shaped anchoring portion 40 which constitutes an intermediate portion becoming embedded in the material of the hub 31 when the lamellas are connected with the hub 31.

We wish to emphasize that the two embodiments which have been illustrated herein are intended for purely exemplary purposes only, and should not be considered limiting in any sense. The invention is, rather, suitable for use with any commutators whose lamella end portions which are to be connected with the armature winding ends are twisted through approximately 90° with reference to the plane of the exposed lamella contact face and are not provided with a recess extending into a lateral margin of the lamella for connecting the winding end portions thereto. It is also point out that the lamellas need not be stamped from a strip of sheet material, such as copper, as shown in FIGS. 2 and 4, but could also be produced from a planar copper disk, from a ring or, if desired, could also be produced individually rather than in the manner shown in FIGS. 2 and 4 where all lamellas for a commutator are produced simultaneously and initially adhere until their respective bridging portions are subsequently severed.

It will be understood that each of the elements described above, or two or more together, may also find a useful application in other types of constructions differing from the types described above.

While the invention has been illustrated and described as embodied in a commutator, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A commutator comprising a substantially disk-shaped hub consisting of electrically insulating material and having two major sides; and an annulus of elongated electrically conductive strip lamellas, each lamella including a first portion embedded in said hub and having an exposed elongated contact face of a width corresponding to the larger cross-sectional dimension of the respective first portion and located at one of said major sides of said hub, said second portions of said lamellas extending outwardly beyond the other major side of said hub, each lamella further including an at least partly exposed second portion twisted through about 90 degrees relative to the respective first portion and located in a plane including the axis of said hub, the smaller cross-sectional dimension of each second portion extending in the circumferential direction of said hub, said first portions being separated from each other by first spaces and said second portions being separated from each other by second spaces substantially wider than said first spaces.

2. A commutator as defined in claim 1, wherein said second portion of each lamella comprises a substantially claw-shaped anchoring portion bounding in part the respective recess and embedded in said hub.

3. A commutator as defined in claim 1, wherein said first portions extend substantially radially from the axis of said hub.

4. A commutator as defined in claim 3, wherein the length of said exposed contact faces is less than said radius of said hub.

5. A commutator as defined in claim 1, wherein each of said lamellas further comprises a lateral recess in said second portion and thereof.

6. A commutator as defined in claim 5, said lamellas each having two longitudinally extending transversely spaced lateral margins; and wherein said second portion is provided with a cut-out in one of said margins located opposite said lateral recess in the other of said margins.

7. A commutator as defined in claim 1, wherein said second portion of each lamella is bent back upon itself so as to form a hook configuration.

References Cited

UNITED STATES PATENTS

| | | | |
|---|---|---|---|
| 3,447,011 | 5/1969 | Amrein | 310—236 |
| 3,519,863 | 7/1970 | Ambler | 310—234 |
| 2,946,908 | 7/1960 | Ulbrich | 310—234 |
| 1,537,692 | 5/1925 | Prouty | 310—237 |
| 2,845,556 | 7/1958 | Gunkler | 310—234 |
| 3,487,249 | 12/1969 | Nicholls | 310—235 |

R. SKUDY, Primary Examiner